United States Patent
Peng et al.

(10) Patent No.: US 10,615,699 B2
(45) Date of Patent: Apr. 7, 2020

(54) VOLTAGE CONVERTER AND VOLTAGE CONVERSION METHOD FOR REDUCING COMMON MODE NOISE

(71) Applicant: Chicony Power Technology Co., Ltd., New Taipei (TW)

(72) Inventors: Tso-Jen Peng, New Taipei (TW); Hsuan-Yu Lai, New Taipei (TW); Mao-Song Pan, New Taipei (TW)

(73) Assignee: Chicony Power Technology Co., Ltd., New Taipei (TW)

( * ) Notice: Subject to any disclaimer, the term of this patent is extended or adjusted under 35 U.S.C. 154(b) by 0 days.

(21) Appl. No.: 16/164,825

(22) Filed: Oct. 19, 2018

(65) Prior Publication Data

US 2020/0076315 A1  Mar. 5, 2020

(30) Foreign Application Priority Data

Aug. 31, 2018  (TW) .............................. 107130466 A

(51) Int. Cl.
   *H02M 3/335*  (2006.01)
(52) U.S. Cl.
   CPC .............................. *H02M 3/33576* (2013.01)
(58) Field of Classification Search
   CPC ............. H02M 3/335; H02M 3/33507; H02M 3/33576
   See application file for complete search history.

(56) References Cited

U.S. PATENT DOCUMENTS

| | | | |
|---|---|---|---|
| 5,850,335 A | * | 12/1998 | Otake ...................... G05F 1/66 363/18 |
| 8,125,158 B2 | | 2/2012 | Nishino et al. |
| 8,351,230 B2 | | 1/2013 | Nishihara et al. |
| 8,605,463 B2 | | 12/2013 | Nakanishi |
| 9,287,798 B2 | | 3/2016 | Stamm et al. |
| 9,847,710 B2 | | 12/2017 | Lee et al. |
| 2005/0104560 A1 | | 5/2005 | Pai |
| 2012/0281445 A1 | * | 11/2012 | Moriya ................... H01F 27/40 363/61 |
| 2014/0139180 A1 | | 5/2014 | Kim et al. |
| 2015/0326141 A1 | | 11/2015 | Takahashi et al. |
| 2015/0326142 A1 | | 11/2015 | Petras et al. |

(Continued)

FOREIGN PATENT DOCUMENTS

| | | |
|---|---|---|
| CN | 101277056 | 10/2008 |
| CN | 101741262 | 6/2010 |
| CN | 103051040 | 4/2013 |

(Continued)

OTHER PUBLICATIONS

"Office Action of Taiwan Counterpart Application", dated Mar. 27, 2019, pp. 1-9.

*Primary Examiner* — Matthew V Nguyen
(74) *Attorney, Agent, or Firm* — Jcipmet

(57) ABSTRACT

A voltage converter and a voltage conversion method are provided. The voltage converter includes a transformer, a primary side conversion circuit, a secondary side conversion circuit, and a first capacitor. The transformer includes a bobbin, a core, a primary coil, and a secondary coil. The primary coil and the secondary coil are wound around the bobbin, and the bobbin covers the core. The first capacitor provides a common mode noise conduction path according to a capacitance value of the first capacitor.

11 Claims, 4 Drawing Sheets

(56) References Cited

U.S. PATENT DOCUMENTS

2015/0355593 A1\* 12/2015 Uchiyama .............. G03G 15/80
                                                      399/88

FOREIGN PATENT DOCUMENTS

| CN | 203632551 | 6/2014 |
|----|-----------|--------|
| TW | 200601662 | 1/2006 |
| TW | I495249   | 8/2015 |
| TW | 201535946 | 9/2015 |
| TW | 201820763 | 6/2018 |

\* cited by examiner

VOLTAGE CONVERTER AND VOLTAGE CONVERSION METHOD FOR REDUCING COMMON MODE NOISE

CROSS-REFERENCE TO RELATED APPLICATION

This application claims the priority benefit of Taiwan application serial no. 107130466, filed on Aug. 31, 2018. The entirety of the above-mentioned patent application is hereby incorporated by reference herein and made a part of this specification.

BACKGROUND OF THE INVENTION

Field of the Invention

The disclosure relates to a voltage converter and a voltage conversion method, and more particularly, to a voltage converter for reducing common mode noise and a voltage conversion method thereof.

Description of Related Art

The voltage converter has been widely used in power supply of electronic devices. The electronic device may be a low power consumption load (e.g., a mobile phone, a small fan, a smart watch, etc.) or a high power consumption load (e.g., a notebook computer, a high brightness lighting device, etc.). Generally, in the case where the voltage converter is applied to a high-power electronic device, it is difficult to meet the design requirements for both a high power density and low common mode noise. When it is difficult to suppress the common mode noise, the common mode noise would enter the secondary side and further interfere with the operation of the electronic components. Therefore, how to prevent common mode noise from interfering with the operation of electronic components is one of the priorities in the development of the voltage converter.

SUMMARY OF THE INVENTION

The invention provides a voltage converter and a voltage conversion method that can be used to reduce common mode noise.

The voltage converter of the invention includes a transformer, a primary side conversion circuit, a secondary side conversion circuit, and at least one first capacitor. The transformer includes a bobbin, a core, at least one primary coil, and at least one secondary coil. The at least one primary coil and the at least one secondary coil are wound around the bobbin, and the bobbin covers the core. The primary side conversion circuit is coupled to the transformer. The secondary side conversion circuit is coupled to the transformer. A first terminal of the at least one first capacitor is coupled to the core, and a second terminal of the at least one first capacitor is coupled to a ground terminal of the primary side conversion circuit. The at least one first capacitor is configured to provide a common mode noise conduction path according to a capacitance value of the at least one first capacitor.

The voltage conversion method of the invention is used to reduce common mode noise of a voltage converter. The voltage converter includes a transformer, a primary side conversion circuit, and a secondary side conversion circuit. The transformer includes a bobbin, a core, at least one primary coil, and at least one secondary coil. The at least one primary coil and the at least one secondary coil are wound around the bobbin, and the bobbin covers the core. The primary side conversion circuit is coupled to the transformer, and the secondary side conversion circuit is coupled to the transformer. The voltage conversion method includes steps below. At least one first capacitor is provided, and a first terminal of the at least one first capacitor is coupled to the core and a second terminal of the at least one first capacitor is coupled to a ground terminal of the primary side conversion circuit. A common mode noise conduction path is provided according to a capacitance value of the at least one first capacitor.

Based on the above, the voltage converter of the invention provides a common mode noise conduction path by coupling the at least one first capacitor to the core and the ground terminal of the primary side conversion circuit. Accordingly, the common mode noise of the voltage converter can be returned to the ground terminal of the primary side conversion circuit.

To provide a further understanding of the aforementioned and other features and advantages of the disclosure, exemplary embodiments, together with the reference drawings, are described in detail below.

DESCRIPTION OF THE EMBODIMENTS

Figure 1:
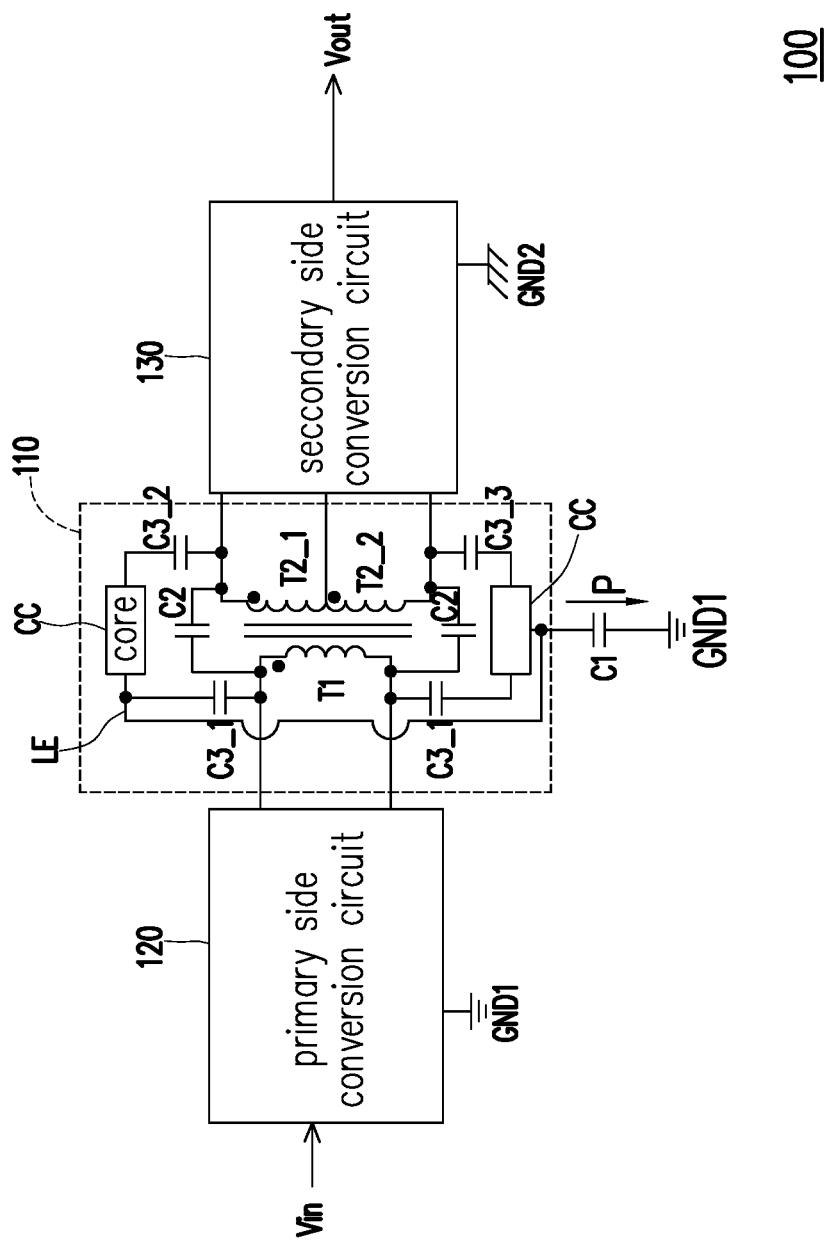
FIG. 1 is a schematic circuit diagram of a voltage converter according to a first embodiment of the invention.

Referring to FIG. 1, FIG. 1 is a schematic circuit diagram of a voltage converter according to first embodiment of the invention. In the present embodiment, a voltage converter 100 includes a transformer 110, a primary side conversion circuit 120, a secondary side conversion circuit 130, and a first capacitor C1. The primary side conversion circuit 120 is configured to receive an input voltage Vin. The transformer 110 is configured to transform the input voltage Vin to provide a converted voltage (e.g., stepping up or stepping down the voltage). The secondary side conversion circuit 130 is configured to process the converted voltage (e.g., a rectification process or a filtering process) to provide an output voltage Vout. The primary side conversion circuit 120 is coupled to the transformer 110 and has a ground terminal GND1. The secondary side conversion circuit 130 is coupled to the transformer 110 and has a ground terminal GND2. The ground terminal GND1 of the primary side conversion circuit 120 and the ground terminal GND2 of the secondary side conversion circuit 130 are not directly connected. For example, the ground terminal GND1 of the primary side conversion circuit 120 is connected to power ground, and the ground terminal GND2 of the secondary side conversion circuit 130 is connected to earth. The primary side conversion circuit 120 and the secondary side conversion circuit 130 of the present embodiment may be circuits configured to increase a power density. The primary side conversion circuit 120 and the secondary side conversion circuit 130 may be, for example, at least one of a resonant conversion circuit, a power factor correction circuit, and a voltage switching circuit. The transformer 110 of the voltage converter 100 further includes a bobbin (not shown), a core CC, a primary coil T1, and secondary coils T2_1, T2_2. In the present embodiment, the first terminal of the first capacitor C1 is coupled to the core CC. The second terminal of the first capacitor C1 is coupled to the ground terminal GND1 of the primary side conversion circuit 120 to provide a common mode noise conduction path P. For ease of description of the invention, the present embodiment is illustrated with the first capacitor C1, the primary coil T1, and the secondary coils T2_1, T2_2 as an example. The first capacitor, the primary coil, and the secondary coil of the invention may respectively be one or plural and are not specifically limited.

In addition, the voltage converter 100 further includes a second capacitor C2 and third capacitors C3_1, C3_2, C3_3. The second capacitor C2 is coupled between the primary coil T1 and the secondary coil T2_1/T2_2. The first terminal of the third capacitor C3_1 is coupled to the core CC. The second terminal of the third capacitor C3_1 is coupled to the primary side conversion circuit 120. The first terminals of the third capacitors C3_2 and C3_3 are coupled to the core CC. The second terminals of the third capacitors C3_2 and C3_3 are coupled to the secondary side conversion circuit 130. The second capacitor C2 and the third capacitors C3_1, C3_2, C3_3 of the present embodiment are stray capacitors (parasitic capacitors) present in the voltage converter 100.

In the present embodiment, the transformer 110 may further include a connection element LE. The connection element LE is coupled between the core CC and the first terminal of the first capacitor C1. In other words, the core CC is electrically connected to the first terminal of the first capacitor C1 via the connection element LE, which thereby ensures that the voltage level at each position on the core CC is in line with the voltage level of the first terminal of the first capacitor C1. In some embodiments, the connection element LE may be a copper foil.

In the present embodiment, the primary coil T1 and the secondary coils T2_1, T2_2 of the transformer 110 are wound around the bobbin (not shown). The bobbin (not shown) covers the core CC. For the transformer 110, the second capacitor C2 is a stray capacitor present between the primary coil T1 and the secondary coil T2_1/T2_2. The third capacitor C3_1 is a stray capacitor present between the core CC and the primary side conversion circuit 120 or between the core CC and the primary coil T1. The third capacitor C3_2 is a stray capacitor present between the core CC and the secondary side conversion circuit 130 or between the core CC and the secondary coil T2_1. The third capacitor C3_3 is a stray capacitor present between the core CC and the secondary side conversion circuit 130 or between the core CC and the secondary coil T2_2. In the design of the first capacitor C1, the capacitance value of the first capacitor C1 is greater than the capacitance values of the second capacitor C2 and the third capacitors C3_1, C3_2, C3_3. Generally, the capacitance values of the second capacitor C2 and the third capacitors C3_1, C3_2, C3_3 are approximately tens of picofarads (pF), so the capacitance value of the first capacitor C1 may be designed to be hundreds of picofarads or thousands of picofarads. Therefore, in terms of the common mode noise, compared to the second capacitor C2 and the third capacitors C3_1, C3_2, C3_3, the first capacitor C1 can form a lower common mode noise conduction path P. When the primary side conversion circuit 120 is operated to cause the transformer 110 to generate a common mode noise, the common mode noise is conducted to the ground terminal GND1 of the primary side conversion circuit 120 via the common mode noise conduction path P. As a result, the common mode noise does not enter the secondary side conversion circuit 130 via the above-mentioned stray capacitors (i.e., the second capacitor C2 and the third capacitors C3_1, C3_2, C3_3) or the voltage conversion operation of the transformer 110 on the input voltage to interfere with the electronic components connected to the secondary side conversion circuit 130. In some embodiments, the first capacitor C1 can be a safety capacitor (e.g., a Y capacitor).

Figure 2:
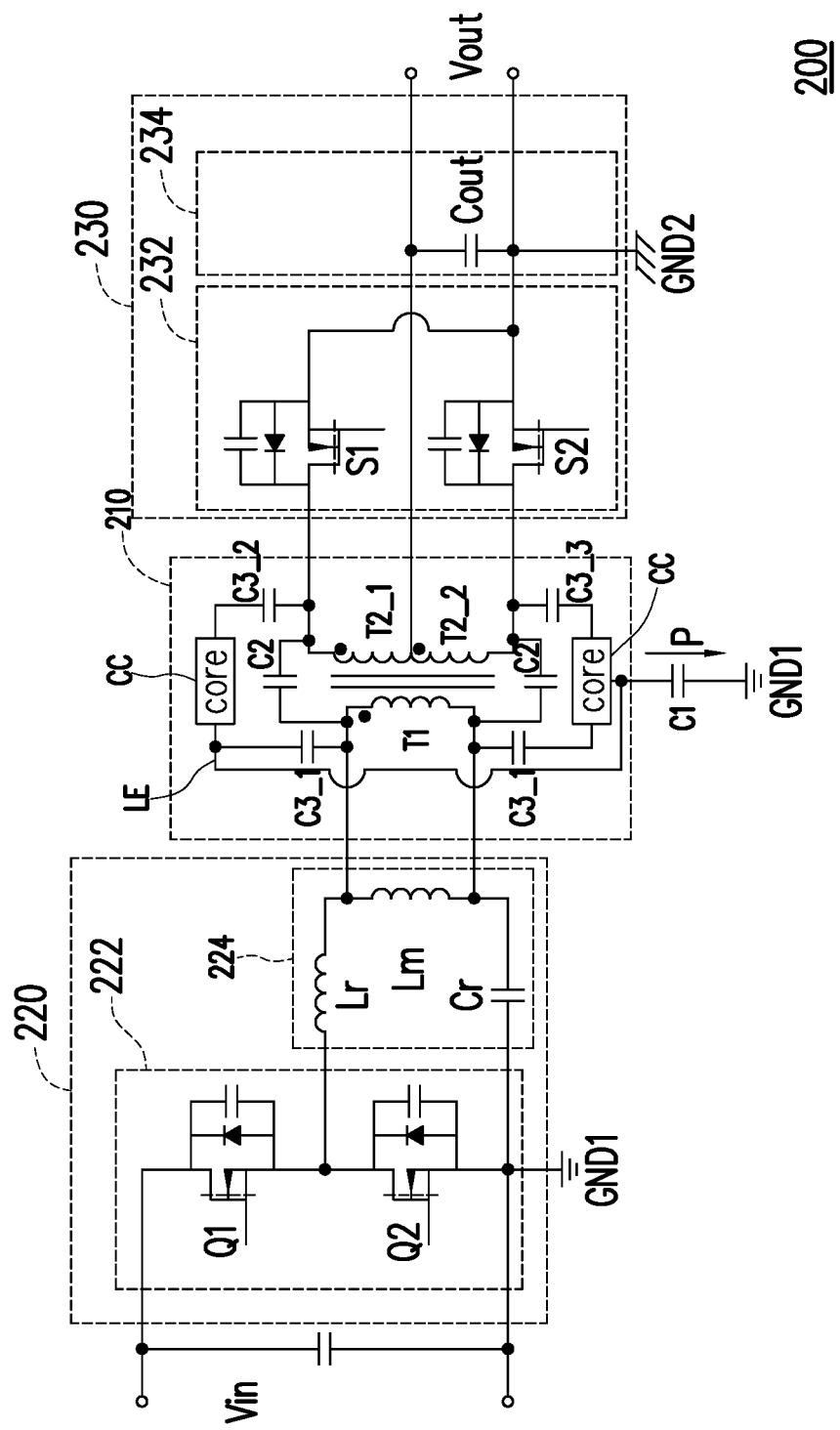
FIG. 2 is a schematic circuit diagram of a voltage converter according to a second embodiment of the invention.

Referring to FIG. 2, FIG. 2 is a schematic circuit diagram of a voltage converter according to a second embodiment of the invention. In the present embodiment, a primary side conversion circuit 220 includes a voltage switching circuit 222 and a resonant conversion circuit 224. The voltage switching circuit 222 includes a first switch Q1 and a second switch Q2. The first terminal of the first switch Q1 is configured to receive an input voltage Vin. The first terminal of the second switch Q2 is coupled to the second terminal of the first switch Q1. The second terminal of the second switch Q2 is coupled to the ground terminal GND1 of the primary side conversion circuit 220. The first switch Q1 and the second switch Q2 are respectively controlled by a control signal to be turned on or off. The resonant conversion circuit 224 is coupled between the voltage switching circuit 222 and the primary coil T1. The resonant conversion circuit 224 includes a resonant inductor Lr, a magnetizing inductor Lm, and a resonant capacitor Cr. The first terminal of the resonant inductor Lr is coupled to the first terminal of the second switch Q2. The first terminal of the magnetizing inductor Lm is coupled to the second terminal of the resonant inductor Lr. The first terminal of the resonant capacitor Cr is coupled to the second terminal of the magnetizing inductor Lm, and the second terminal of the resonant capacitor Cr is coupled to the ground terminal GND1 of the primary side conversion circuit 220.

The secondary side conversion circuit includes a rectification circuit 232 and a filter circuit 234. The rectification circuit 232 is configured to perform a rectification operation on a converted voltage converted by the transformer. The rectification circuit 232 includes rectification switches S1, S2. The first terminal of the rectification switch S1 is coupled to the output terminal of the secondary coil T2_1. The first terminal of the rectification switch S2 is coupled to the output terminal of the secondary coil T2_2. The second terminal of the rectification switch S2 is coupled to the second terminal of the rectification switch S1. The rectification switches S1, S2 are respectively controlled by a control signal to be turned on or off. The filter circuit 234 is configured to perform a filtering operation on the converted voltage converted by the transformer 210. In the present embodiment, the filter circuit 234 is coupled to the rectification circuit 232. The ground terminal of the filter circuit 234 is coupled to the ground terminal GND2 of the secondary side conversion circuit 230. The filter circuit 234 at least includes a filter capacitor Cout. The first terminal of the filter capacitor Cout is coupled to the tapping points of the secondary coils T2_1, T2_2. The second terminal of the filter capacitor Cout is coupled to the ground terminal GND2 of the secondary side conversion circuit. In the present embodiment, the rectification circuit 232 and the filter circuit 234 may function together to perform a rectification/filtering operation on the converted voltage converted by the transformer 210 to provide an output voltage Vout.

The combination of the voltage switching circuit 222, the resonant conversion circuit 224, the transformer 210, and the rectification circuit 232 of the present embodiment may serve to realize a half-bridge resonant circuit. Therefore, the voltage converter 200 can exhibit the advantage of a high power density of a half-bridge resonant circuit. In other embodiments, the rectification switches S1, S2 of the rectification circuit 232 may be implemented as diodes. The invention is not limited to the coupling methods of the voltage switching circuit 222, the resonant conversion circuit 224, the rectification circuit 232, and the filter circuit 234 of the present embodiment. In some embodiments, the transformer 210 and the first capacitor C1 of the present embodiment may be applicable to a full-bridge resonant circuit or a flyback conversion circuit.

It is noted that the combination of the voltage switching circuit 222, the resonant conversion circuit 224, the transformer 210, and the rectification circuit 232 described above can enable the voltage converter 200 to achieve a high power density. In addition, the first capacitor C1 is coupled between the core CC and the ground terminal GND1 of the primary side conversion circuit 220 to provide a common mode noise conduction path P. Therefore, the common mode noise is conducted to the ground terminal GND1 of the primary side conversion circuit 220 via the common mode noise conduction path P and does not enter the secondary side conversion circuit 230 to interfere with the electronic components connected to the secondary side conversion circuit 230.

Reference may be made to the transformer 110 shown in FIG. 1 and FIG. 2 for implementation details of the transformer 210 of the present embodiment, which shall not be repeatedly described here.

Figure 3:
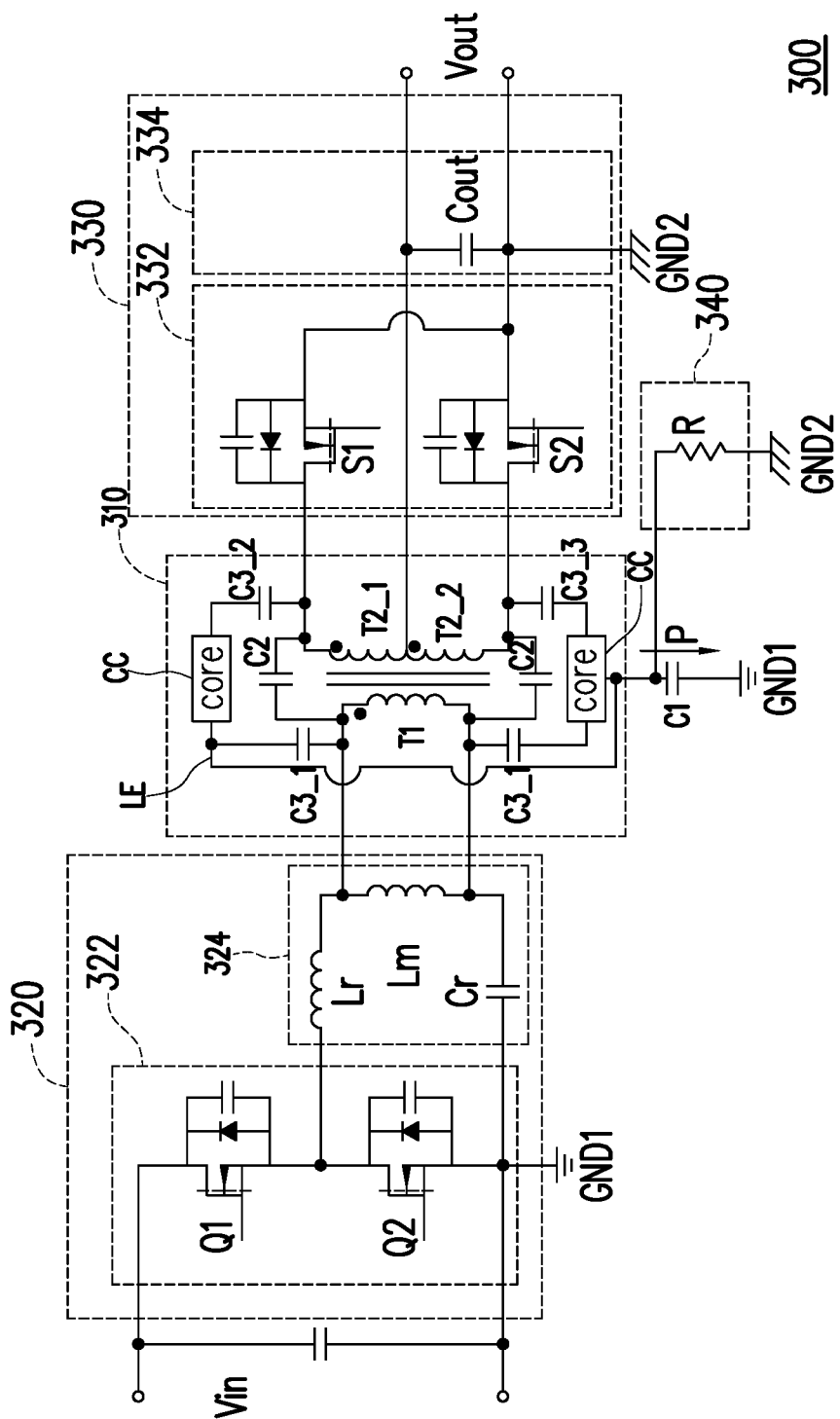
FIG. 3 is a schematic circuit diagram of a voltage converter according to a third embodiment of the invention.

Referring to FIG. 3, FIG. 3 is a schematic circuit diagram of a voltage converter according to a third embodiment of the invention. In the present embodiment, different from the voltage converter 200 of the second embodiment (FIG. 2), a voltage converter 300 further includes a level circuit 340. The level circuit 340 includes a resistor R. The first terminal of the resistor R is coupled to the first terminal of the first capacitor C1, and the second terminal of the resistor R is coupled to the ground terminal GND2 of a secondary side conversion circuit 330. The level circuit 340 is configured to provide a voltage level to the core CC according to the resistance value of the resistor R. In other words, the level circuit 340 provides a safe voltage level to the core CC according to the resistor R and the value of current passing through the resistor R to thereby reduce the possibility of electric arcing on the secondary side during electromagnetic compatibility (EMC) testing or use of the voltage converter 300. In addition, the level circuit 340 can also reduce occurrence of leakage current through the resistor R, which thereby achieves the effect of power saving.

In other embodiments, the level circuit 340 may be a voltage stabilizing circuit having a Zener diode, and the level circuit 340 of the invention is not limited to the third embodiment.

Reference may be made to the voltage switching circuit 222, the resonant conversion circuit 224, the transformer 210, the first capacitor C1, and the rectification circuit 220 shown in FIG. 2 for implementation details of a voltage switching circuit 322, a resonant conversion circuit 324, a transformer 310, the first capacitor C1, and a rectification circuit 332 of the present embodiment.

Figure 4:
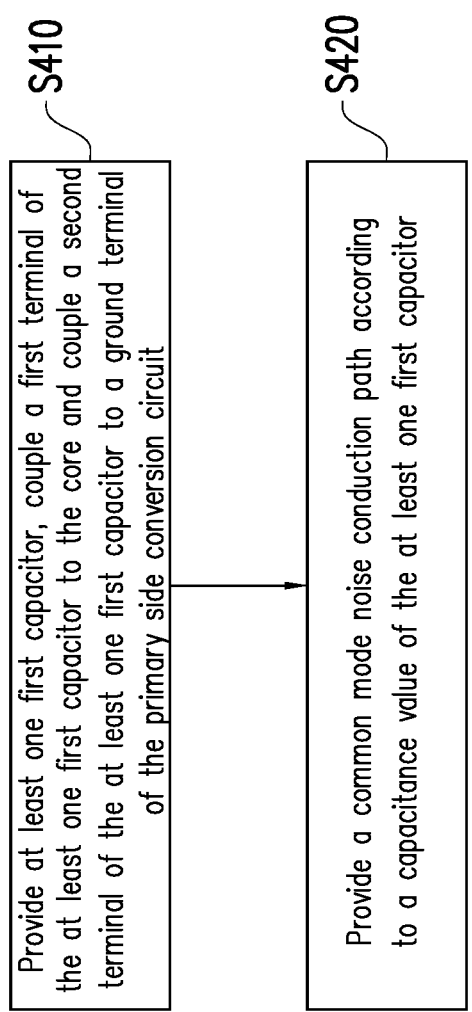
FIG. 4 is a schematic flowchart of a voltage conversion method according to an embodiment of the invention.

Referring to FIG. 1 and FIG. 4 at the same time, FIG. 4 is a schematic flowchart of a voltage conversion method according to an embodiment of the invention. In step S410, at least one first capacitor C1 is provided, and the first terminal of the at least one first capacitor C1 is coupled to the core CC and the second terminal of the at least one first capacitor C1 is coupled to the ground terminal GND1 of the primary side conversion circuit 220. In step S420, a common mode noise conduction path P is provided according to a capacitance value of the at least one first capacitor C1. The implementation details of steps S410 and S420 may be sufficiently taught in the embodiments of FIG. 1 and FIG. 3 and thus are not repeatedly described here.

In summary of the above, the voltage converter of the invention can conduct the common mode noise of the voltage converter to the ground terminal of the primary side conversion circuit through the common mode noise conduction path provided by the first capacitor. Accordingly, the common mode noise does not enter the secondary side conversion circuit via the above-mentioned stray capacitors or the voltage conversion operation of the transformer on the input voltage to interfere with the electronic components connected to the secondary side conversion circuit. In addition, the voltage converter further includes the level circuit. The level circuit provides a safe voltage level to the core according to the resistor and the value of current passing through the resistor to thereby reduce the possibility of electric arcing on the secondary side and reduce occurrence of leakage current, which in turn achieves the effect of power saving.

Although the invention has been disclosed as the embodiments above, the embodiments are not meant to limit the invention. Any person skilled in the art may make slight modifications and variations without departing from the spirit and scope of the invention. Therefore, the protection scope of the invention shall be defined by the claims attached below.

What is claimed is:

1. A voltage converter for reducing common mode noise, comprising:
    a transformer comprising a bobbin, a core, at least one primary coil, and at least one secondary coil, wherein the at least one primary coil and the at least one secondary coil are wound around the bobbin, and the bobbin covers the core;
    a primary side conversion circuit coupled to the transformer;
    a secondary side conversion circuit coupled to the transformer;
    at least one first capacitor, wherein a first terminal of the at least one first capacitor is connected to the core and a second terminal of the at least one first capacitor is connected to a ground terminal of the primary side conversion circuit to provide a common mode noise conduction path according to a capacitance value of the at least one first capacitor;
    at least one second capacitor coupled between the at least one primary coil and the at least one secondary coil; and
    at least one third capacitor, wherein a first terminal of the at least one third capacitor is coupled to the core, and a second terminal of the at least one third capacitor is coupled to the primary side conversion circuit or the secondary side conversion circuit,
    wherein the capacitance value of the at least one first capacitor is greater than a capacitance value of the at least one second capacitor and a capacitance value of the at least one third capacitor.

2. The voltage converter according to claim 1, wherein when a common mode noise generated by the primary side conversion circuit enters the transformer, the common mode noise is conducted to the primary side conversion circuit via the common mode noise conduction path.

3. The voltage converter according to claim 2, wherein the primary side conversion circuit comprises:
    a voltage switching circuit comprising:

a first switch, wherein a first terminal of the first switch is configured to receive an input voltage; and a second switch, wherein a first terminal of the second switch is coupled to a second terminal of the first switch, and a second terminal of the second switch is coupled to the ground terminal of the primary side conversion circuit.

4. The voltage converter according to claim 3, wherein the primary side conversion circuit comprises:

a resonant conversion circuit coupled between the voltage switching circuit and the at least one primary coil, the resonant conversion circuit comprising:

a resonant inductor, wherein a first terminal of the resonant inductor is coupled to the first terminal of the second switch;

a magnetizing inductor, wherein a first terminal of the magnetizing inductor is coupled to a second terminal of the resonant inductor; and a resonant capacitor, wherein a first terminal of the resonant capacitor is coupled to a second terminal of the magnetizing inductor, and a second terminal of the resonant capacitor is coupled to the ground terminal of the primary side conversion circuit.

5. The voltage converter according to claim 3, wherein when the voltage switching circuit switches the input voltage, the primary side conversion circuit generates the common mode noise.

6. The voltage converter according to claim 1, further comprising:

a level circuit comprising at least one resistor, wherein a first terminal of the at least one resistor is coupled to the first terminal of the at least one first capacitor and a second terminal of the at least one resistor is coupled to a ground terminal of the secondary side conversion circuit to provide a voltage level to the core according to a resistance value of the at least one resistor.

7. The voltage converter according to claim 1, wherein the secondary side conversion circuit comprises:

a rectification circuit configured to perform a rectification operation on a converted voltage converted by the transformer; and a filter circuit configured to perform a filtering operation on the converted voltage converted by the transformer, wherein a ground terminal of the filter circuit is coupled to a ground terminal of the secondary side conversion circuit.

8. The voltage converter according to claim 1, wherein the core is electrically connected to the first terminal of the at least one first capacitor via a connection element.

9. A voltage conversion method for reducing common mode noise of a voltage converter, wherein the voltage converter comprises a transformer, a primary side conversion circuit, and a secondary side conversion circuit, and the transformer comprises a bobbin, a core, at least one primary coil, and at least one secondary coil, wherein the at least one primary coil and the at least one secondary coil are wound around the bobbin, and the bobbin covers the core, wherein the primary side conversion circuit is coupled to the transformer, and the secondary side conversion circuit is coupled to the transformer, the voltage conversion method comprising:

providing at least one first capacitor, and connecting a first terminal of the at least one first capacitor to the core and connecting a second terminal of the at least one first capacitor to a ground terminal of the primary side conversion circuit; and providing a common mode noise conduction path according to a capacitance value of the at least one first capacitor, wherein the voltage converter further comprises at least one second capacitor and at least one third capacitor, wherein the at least one second capacitor is coupled between the at least one primary coil and the at least one secondary coil, a first terminal of the at least one third capacitor is coupled to the core, and a second terminal of the at least one third capacitor is coupled to the primary side conversion circuit or the secondary side conversion circuit, wherein the step of providing the at least one first capacitor comprises:

providing the capacitance value of the at least one first capacitor, wherein the capacitance value of the at least one first capacitor is greater than a capacitance value of the at least one second capacitor and a capacitance value of the at least one third capacitor.

10. The voltage conversion method according to claim 9, wherein the step of providing the common mode noise conduction path according to the capacitance value of the at least one first capacitor comprises:

receiving an input voltage; and when the input voltage is switched, conducting the common mode noise generated by the primary side conversion circuit to the ground terminal of the primary side conversion circuit via the common mode noise conduction path.

11. The voltage conversion method according to claim 9, further comprising:

providing a level circuit comprising at least one resistor, coupling a first terminal of the at least one resistor to the first terminal of the at least one first capacitor, and coupling a second terminal of the at least one resistor to a ground terminal of the secondary side conversion circuit; and providing a voltage level to the core according to a resistance value of the level circuit.

* * * * *